United States Patent [19]
Schonover
[11] 3,833,854
[45] Sept. 3, 1974

[54] DIGITAL PHASE SHIFTER

[75] Inventor: Robert W. Schonover, Endicott, N.Y.
[73] Assignee: The Singer Company, Binghamton, N.Y.

[22] Filed: Dec. 14, 1972
[21] Appl. No.: 315,050

Related U.S. Application Data
[62] Division of Ser. No. 164,688, July 21, 1971.

[52] U.S. Cl. .................... 328/155, 328/48, 328/55, 328/62
[51] Int. Cl. .................... H03k 3/64
[58] Field of Search .......... 328/55, 129, 155, 48, 62

[56] References Cited
UNITED STATES PATENTS

| | | | |
|---|---|---|---|
| 3,096,483 | 7/1963 | Ransom | 328/48 |
| 3,154,743 | 10/1964 | Nichols et al. | 328/48 |
| 3,226,568 | 12/1965 | Samwel | 328/129 X |
| 3,258,696 | 6/1966 | Heymann | 328/48 X |
| 3,500,214 | 3/1970 | Broadhead et al. | 328/48 |
| 3,564,284 | 2/1971 | Kamens | 328/129 X |
| 3,629,715 | 12/1971 | Brown | 328/48 X |
| 3,697,879 | 10/1972 | Holliday | 328/48 X |
| 3,728,635 | 4/1973 | Eisenberg | 328/48 X |

*Primary Examiner*—John S. Heyman
*Attorney, Agent, or Firm*—James C. Kesterson

[57] ABSTRACT

A digital phase shifter wherein pulses on one pulse train are advanced or delayed with respect to pulses on another pulse train in response to a digital command indicating the desired advance or delay. Two counters having a common clock input provide the pulse trains with the counter providing the one pulse train having means by which it may be preset by the command on occurrence of a pulse on the other pulse train. The phase shifter of this invention is particularly applicable for supplying sync commands in a system comprising a television camera and a matrix of displays on which the image generated by the camera may be selectively positioned is also shown.

6 Claims, 2 Drawing Figures

INVENTOR.
Robert W. Schonover
BY
John C. Altmiller
AGENT

INVENTOR.
Robert W. Schonover
BY
John C. Altmiller
AGENT

DIGITAL PHASE SHIFTER

This invention herein described was made in the course or under a contract, or subcontract thereof, with The Department of the Navy.

CROSS-REFERENCE TO RELATED APPLICATIONS

This is a division of application Ser. No. 164,688 filed July 21, 1971.

This invention relates to a digital phase shifter and its associated circuitry useful, for example, in synchronizing a matrix of visual displays.

In a simulator such as that used for pilot training, the wide angle displays comprising a matrix of smaller display disclosed in U.S. Pat. No. 3,659,920 issued to F. W. McGlasson on May 2, 1972, and the method of placing an image which may be smaller than the total wide angle display on such a display, in a desired location, disclosed in U.S. Pat. No. 3,697,681 issued to R. F. H. McCoy on Oct. 10, 1972 are incorporated. The latter patent discloses delaying certain of the sweeps on a plurality of CRT displays arranged in a matrix to come up with a continuous raster over the total wide angle display matrix and controlling the occurence of the sweep of the camera generating the image to be displayed with respect to the display sweeps in order to position the image as desired on the face of the matrix. In addition, video switching to turn on video to the proper displays in the matrix at the proper time is shown. Up to now conventional analog delay techniques have been used to accomplish the required delays.

However, since the control signals for positioning the image on the display are in digital form and must then be converted to analog signals, and due to the limited resolution and accuracy of analog signals, it is desirable to have a system where both the sweep delays and the video switching would be done digitally.

The present invention which provides precise phase shifting of digital pulses, is particularly suitable for providing precise delay indications such as are needed in visual displays using a matrix of CRT's. The digital delay system comprises novel digital pulse delay apparatus which can control the occurence of two pulses with respect to each other in response to a digital command input.

It is the object of this invention to provide apparatus which will control the occurrence of one pulse with respect to another.

Another object is to provide such apparatus which may be used to provide sweep reference signals for a matrix display system and its associated image generator.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which.

Figure 1:
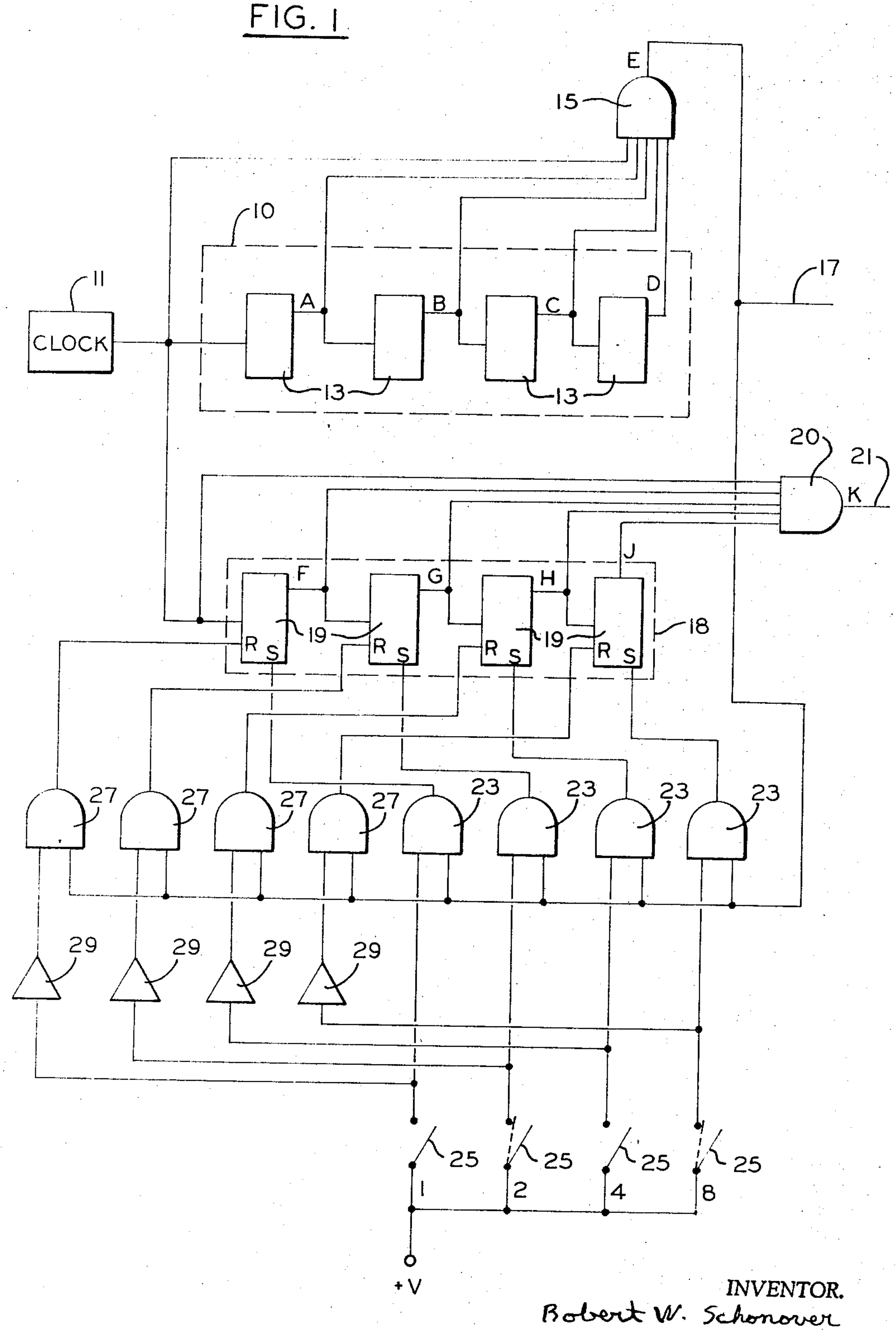
FIG. 1 is a logic diagram of a preferred embodiment of the pulse delay apparatus of the present invention.
Figure 2:
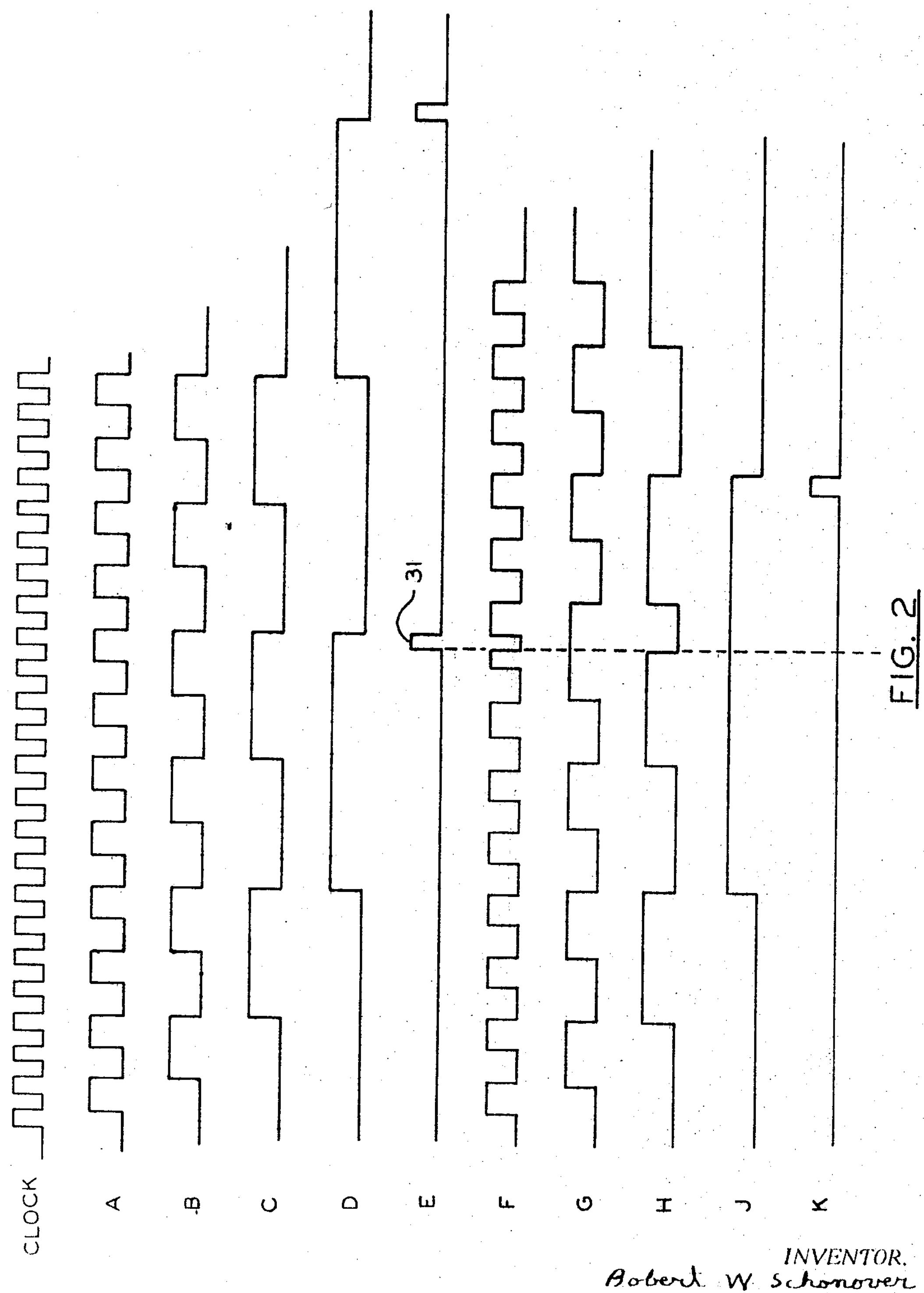
FIG. 2 is a timing diagram of the apparatus of FIG. 1.

FIG. 1 is a logic diagram of a simplified form of the digital pulse delay apparatus. A clock 11 provides input pulses to a counter 10 comprising four flip flops 13. The output of each flip flop along with the clock pulses are provided to an AND gate 15 which provides an output on line 17. The timing diagram for the pulses is shown on FIG. 2 with the letters thereon corresponding to the letters of the flip flops of FIG. 1. Examination of FIG. 2 shows that after 15 clock pulses all inputs, from flip flops 13, to gate 15 of FIG. 1 will be logical 1's. Thus the 16th clock pulse will be able to pass through the gate 15 and an output pulse 31 (on E of FIG. 2) on line 17 (of FIG. 1) results. When the 16th pulse goes to zero, all flip flops will go to zero and the process will repeat. (For counts not equal to the natural modulus of the counter, gating may be used to reset all flip flops at the desired count. For example, if an output were desired at the 11th clock pulse, A, B and D would be ANDed with the clock pulse in gate 15. The output on line 17 would then also be used to reset all the flip flops A through D.)

A second counter 18 comprising four flip flops 19 provides, out of its associated And gate 20, a pulse which may be advanced or delayed from the reference pulse output on line 17. Normally both counters would be reset (by a reset line not shown) prior to start up and would count together providing output pulses on lines 17 and 21 at the same time. The addition of gates 23 and 27 and switches 25 makes it possible to advance or delay the output on line 21 by presetting counter 18 at the beginning of each pulse on line 17. For example, if it is desired to delay the output on line 21 five counts from that on 17 (or when it is desired to have it advanced 11 counts, both being the same depending on the point of reference), it is necessary that the lower counter be at a count of 11 when the upper counter is at zero (or 16). To accomplish this, switches 25 marked 2 and 8 (for a count of 10) are placed in the position shown by dotted lines. These two switches will place logical 1's on their corresponding gates 23, enabling them. Each gate output is connected to the set input of a corresponding one of flip flops 19. When an output pulse appears on line 17 it will pass through the enabled gates and set the corresponding flip flops G and J. A second set of gates 27 have as one input the output of switches 25 inverted through inverters 29. These gates 27 also have their second inputs connected to line 17 and have their output connected to the reset inputs of flip flops 19. Thus the switches marked 1 and 4 will have outputs which are logical zeros. After inversion by inverters 29 they will become logical 1's and will enable their corresponding gates 27. When an output pulse appears on line 17 it will pass through the enabled gates 27 resetting their corresponding flip flops F and H.

FIG. 2 shows a timing diagram indicating what occurs when a pulse appears on line 17. Prior to the occurrence of pulse 31 on E of FIG. 2 (Line 17 of FIG. 1) the two counters were synchronized. That is, the pulse trains for A and F, B and G, C and H and D and J will have been identical. Thus, just prior to the occurance of pulse 31, all the flip flops 19 will be set and F, G, H and J all "ones". When pulse 31 occurs set inputs will be provided to flip flops G and J via gates 23 of FIG. 1 and reset inputs to F and H via gates 27. The count which was at 15 is now changed to 10. When pulse 31 goes to zero the count will advance to 11. Thus the counter 10 on FIG. 1 will be at 0 and the counter 18 at 11. After 4 more counts an output will occur on line 21 of FIG. 1 (K of FIG. 2). In other words, the pulse on line 21 is 11 counts ahead of (or 5 counts behind) that on line 17. This difference or shift in the outputs on lines 17 and 21 will be maintained until the setting of switches 25 is changed to change the advance or delay.

The delay apparatus described above is particularly useful in the type of system described in U.S. Pat. No. 3,697,681 issued to R. F. H. McCoy on Oct. 10, 1972. In that system a single television image may be displayed anywhere on a plurality of narrow angle displays arranged to form a wide angle display matrix.

Thus, circuitry which will provide digital signals precisely delayed as selected from a reference signal, which circuitry may be used with a visual display system using a matrix display has been shown. It will be evident to those skilled in the art that the pulse shifting circuitry will have many other applications in systems other than such visual display system and it is not the intention of the inventor to limit its application to such a visual display system.

What is claimed is:

1. A digital phase shifter to generate first and second pulse trains having the same repetition rate and wherein said first and second pulse trains may be selectively phase-shifted a preselected number of clock pulses with respect to each other comprising:

means to generate clock pulses;

a first counter adapted to receive each of said clock pulses and to advance in count with each of said received clock pulses;

means to provide an output pulse from said first counter each time said first counter is advanced to a first predetermined count level, a plurality of said output pulses from said first counter generating a first pulse train;

a second counter comprised of a plurality of flip-flops each having a set and reset input and each adapted to receive each of said clock pulses and to advance in count with each of said received clock pulses;

selection means for providing a combination of signals in binary form representative of a selected count level;

a plurality of gates, each having its output connected to one of said set or reset inputs of said flip-flops and each having one input responsive to one of said combination of signals and another input responsive to said output pulse from said first counter such that said second counter is at said selected count level; and means to provide an output pulse from said second counter each time a total of said preset selected count level and the number of clock pulses received by said second counter is also equivalent to said predetermined count level, a plurality of said output pulses from said second counter generating a second pulse train which is shifted a preselected number of clock pulses from said first pulse train.

2. The invention according to claim 1 wherein said plurality of gates comprises a first group of AND gates each having its output connected to said input of one of said flip-flops and a second group of AND gates each having its output connected to said reset input of one of said flip-flops, and further comprising a plurality of inverters, each located between one of said second group of AND gates and one of said combination of signals.

3. The invention according to claim 1 wherein said first and second counters advance on the trailing edge of said clock pulses and said presetting means operates on the leading edge of said selected pulses.

4. The invention according to claim 1 wherein said selection means comprises a plurality of switches.

5. The invention according to claim 1 wherein said selection means comprises a general purpose digital computer programmed to provide said selected count level as a binary word.

6. The invention according to claim 1 wherein said first counter is comprised of a plurality of flip-flops.

* * * * *